United States Patent [19]

Moesch

[11] 4,326,978

[45] Apr. 27, 1982

[54] SOAP BAR WITH ANTIMICROBIAL ACTION

[75] Inventor: Boris Moesch, Reinach, Switzerland

[73] Assignee: Ciba-Geigy Corporation, Ardsley, N.Y.

[21] Appl. No.: 205,823

[22] Filed: Nov. 10, 1980

[30] Foreign Application Priority Data

Nov. 16, 1979 [CH] Switzerland ..................... 10253/79

[51] Int. Cl.[3] ..................... C09K 15/02; C11D 9/18; C11D 9/50; C11D 17/00

[52] U.S. Cl. ..................... 252/107; 252/131; 252/133; 252/134; 252/174.25; 252/397; 252/400 R; 252/404; 260/398.5; 568/580

[58] Field of Search ..................... 260/398.5; 568/580; 252/106, 107, 131, 133, 134, 397, 400 R, 404, 174.25, 140

[56] References Cited

U.S. PATENT DOCUMENTS

| | | | |
|---|---|---|---|
| 1,943,253 | 1/1934 | Alton | 260/398.5 |
| 1,968,628 | 7/1934 | Alton | 260/398.5 |
| 2,625,514 | 1/1953 | Kirschenbauer | 252/131 |
| 3,284,362 | 11/1966 | Zussman | 252/107 |
| 3,544,474 | 12/1970 | Shaffer | 252/131 |
| 3,784,698 | 1/1974 | Model | 252/107 X |
| 3,880,773 | 4/1975 | White | 252/400 A |
| 3,909,461 | 9/1975 | Culmone | 252/131 X |
| 4,060,508 | 11/1977 | Sugahara | 252/400 R |
| 4,115,294 | 9/1978 | Fearnley et al. | 252/106 |
| 4,118,332 | 10/1978 | Apostolatos | 252/107 |
| 4,235,733 | 11/1980 | Watanabe | 252/107 |
| 4,282,110 | 8/1981 | Koike | 252/107 |

FOREIGN PATENT DOCUMENTS

| | | | |
|---|---|---|---|
| 1024022 | 3/1966 | United Kingdom | 424/340 |
| 1175408 | 12/1969 | United Kingdom | 252/107 |

*Primary Examiner*—Dennis L. Albrecht

*Attorney, Agent, or Firm*—Edward McC. Roberts

[57] ABSTRACT

A soap bar which contains, as antimicrobial compound, a halogenated o-hydroxydiphenyl ether, as well as a colorless silicate which is virtually insoluble in water and wich diminishes the discoloration of the soap caused by the antimicrobial compound on exposure to sunlight. There is also disclosed a method of improving the aspect of bars of soap which contain such antimicrobial compounds by adding to the soap base a colorless silicate which is virtually insoluble in water, optionally in conjunction with a fatty acid containing 8 to 22 carbon atoms and/or a N-acylsarcosine.

16 Claims, No Drawings

SOAP BAR WITH ANTIMICROBIAL ACTION

The present invention relates to soap bars with antimicrobial action and to a method of diminishing the discolouration of the soap caused by the antimicrobial agent and of improving the aspect of said bars of soap.

Halogenated phenols are known antimicrobial compounds which can also be incorporated in soaps in order to impart to these e.g. a disinfecting action. Many of these phenols, e.g. halogenated o-hydroxydiphenyl ethers, which are excellent antimicrobial compounds and therefore also extremely effective in soaps (cf. for example British patent specification No. 1,024,022), have the disadvantage that they cause yellowing in bars of soap when these are exposed to light. The bars of soap thus assume an undesired unattractive appearance.

Methods of diminishing and/or avoiding this disadvantage have already been proposed. For example, U.S. Pat. No. 3,284,362 teaches the incorporation of aromatic carboxylic acids as light stabilizers in soaps, whereby a certain improvement in quality of the soap is obtained.

British patent specification No. 1,175,408 postulates the incorporation of free straight-chain fatty acids in soaps containing halogenated o-hydroxydiphenyl ethers. A certain improvement in quality is thereby obtained, without at the same time providing a complete solution to the problem. Many of the fatty acids cited are often a regular constituent of finished bars of soap in so-called "superfatted soaps".

Finally, it is known from U.S. Pat. No. 4,115,294 that the addition of N-acylsarcosine derivatives reduces the light sensitivity of soaps containing halogenated o-hydroxydiphenyl ethers and thus keeps the deterioration in aspect on exposure to light within bounds.

The present invention has for its object to find a solution to the problem stated at the outset. Surprisingly, it has been found that the addition to the soap composition of a colourless silicate which is virtually insoluble in water is able to diminish most effectively the discolouration of soaps on exposure to light, and to do so to a much greater degree than the known methods referred to above. Accordingly, the present invention provides a soap bar with antimicrobial action and containing, as antimicrobial compound, a halogenated o-hydroxydiphenyl ether of the formula

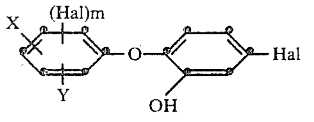

(1)

wherein X is halogen, methyl, methoxy or hydroxyl, Y is hydrogen, methyl or trifluoromethyl, Hal is a halogen atom and m is 0, 1 or 2, which soap bar additionally contains a colourless silicate which is virtually insoluble in water.

Preferred antimicrobial compounds in soap bars of the present invention have the formula

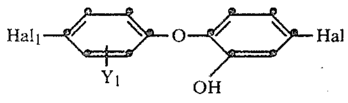

(2)

wherein each of Hal and $Hal_1$ independently is a halogen atom and $Y_1$ is hydrogen or halogen.

Suitable halogens in formulae (1) and (2) above are fluorine, chlorine, bromine and iodine, preferably chlorine and bromine, with chlorine being most preferred.

Representative examples of antibacterial compounds of the formulae (1) and (2) are: 3',4,4'-trichloro-2-hydroxydiphenyl ether, 4,4'-dichloro-2-hydroxydiphenyl ether, 4-chloro-4'-bromo-2-hydroxydiphenyl ether, 4-chloro-4'-iodo-2-hydroxydiphenyl ether, 4-chloro-4'-fluoro-2-hydroxydiphenyl ether, 4-bromo-4'-chloro-2-hydroxydiphenyl ether, 4-bromo-2',4-dichloro-2-hydroxydiphenyl ether, 4,4'-dibromo-2-hydroxydiphenyl ether, 4,2'-4'-trichloro-2-hydroxydiphenyl ether and 4,4',5'-trichloro-2-hydroxydiphenyl ether.

The soap bars of the present invention can also contain the antimicrobial compounds of the formula (1) together with other antimicrobial compounds such as halogenated hydroxydiphenyl methanes, halogenated salicylanilides, halogenated diphenylureas, such as trichlorocarbanilide, tribromosalicylanilide, dibromosalicylanilide and the zinc salt of 1-hydroxy-2-pyridinethione.

The most preferred soap bars contain, an antimicrobial compound, 4,2',4'-trichloro-2-hydroxydiphenyl ether.

The soap bars of the invention contain the antimicrobial compound (or a mixture of several antimicrobial compounds) in general in a concentration of 0.05 to 3% by weight, preferably 0.2 to 2% by weight, based on the total weight of the soap bar.

The colourless, virtually water-insoluble silicate contained in the soap bars of the invention can be any silicate of the above specification known from textbooks of inorganic chemistry. Examples of such silicates are:

(1) Orthosilicates with the anion $SiO_4^{4-}$, metasilicates with the anion $SiO_3^{2-}$, pyro- or disilicates with the anion $Si_2O_7^{6-}$.

(2) Silicates with ring structures in which 3 or more tetrahedra share 2 corners with other tetrahedra, for example those of the formula

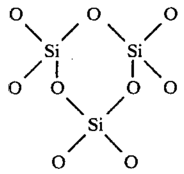

(3) Silicates with "infinite" chains, e.g. those having the lattice formula

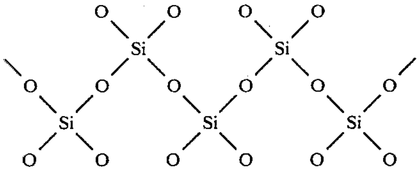

Similar to the above mentioned annular structures, these chains have the empirical formula $(SiO_3)_n^{2n-}$.

(4) Silicates in which the tetrahedra share 3 corners, so forming two-dimensional "infinite" sheets with alternately one oxygen atom and one silicon atom.

(5) Silicates in which the $SiO_4$ tetrahedra share all 4 corners, so forming three-dimensional skeletons which consist of completely crosslinked chains of alternating oxygen and silicon atoms.

Suitable cations for the silicate structures specified above are all those that do not colour the resultant silicates and do not make them water-soluble. The most suitable ions are bivalent ions, especially alkaline earth metal ions such as Ca, Mg, and Ba. Magnesium silicates are especially preferred.

It is, of course, also possible to use mixtures of silicates with several cations, e.g. with Na, K, Al etc., and also mixtures of salts with other anions (e.g. $OH^-$, $Cl^-$, $F^-$ etc.). Silicon atoms in polymer silicate anions can also be partially replaced by aluminium ions or other ions which are ordinarily able to replace silicon in such compounds.

Suitable silicates can also be characterized by a specific ratio between the corresponding metal oxide and $SiO_2$, e.g. in accordance with the hypothetical formula $$(cat_{2/n}O)_x \cdot (SiO_2)_y,$$

wherein "cat" is a cation as defined above, n, x and y are specific integers, e.g. n and x are integers from 0.5 to 1.5 and y is an integer from 0.6 to 6. These silicates can also contain further metal atoms, e.g. in the form of oxides MeO or $Me_2O_3$, wherein Me is e.g. boron, beryllium, aluminium and similar metal atoms.

As already mentioned, preferred silicates for use in the soap bars of this invention are magnesium silicates, e.g. those of the formula $$MgO \cdot (SiO_2)_{y'},$$

wherein y' is any number from 1 to 3.5, preferably from 1 to 1.5. Accordingly, this means that, in the preferred magnesium silicates, the ratio of MgO to $SiO_2$ is 1:3.5 to 1:1, especially 1:1.5 to 1:1. Where the ratio is 1:1, the magnesium silicate has the formula $MgSiO_3$.

A soap bar of this invention preferably contains 0.1 to 10% by weight, especially 0.5 to 5% by weight, of silicate, based on the total weight of the soap bar.

If the soap bar does not consist already of a superfatted soap, i.e. of a soap that additionally contains free, especially straight-chain, preferably substantially saturated fatty acids containing 8 to 22 carbon atoms, it is possible to incorporate such acids additionally into the soap base. The soap bar of the invention can then additionally contain preferably about 0.1 to 15% by weight, especially 1 to 10% by weight, of fatty acids, based on the total weight of the soap bar.

The additional presence of the free fatty acids can still further enhance the improvement in the aspect of the soap bar caused by the silicate (by diminishing the discolouration on exposure to light). The effect then obtained is better than the effect produced by the silicate alone, and is naturally substantially better than the effect that would have been obtained by the free fatty acids alone (q.v. the Examples).

Examples of $C_8$–$C_{22}$ fatty acids (and also mixtures thereof) which can be contained in soap bars of this invention include: capric, lauric, myristic, palmitic, stearic, arachidic, sebacic, dodecanedicarboxylic, thapsisdicarboxylic, hexadecanedicarboxylic and octadecanedicarboxylic acid, as well as mixtures of acids obtained from coconut oil, tallow fat or palm kernel oil. Preferred fatty acids are stearic acid, palmitic acid, myristic acid, lauric acid and the acid mixtures obtained from coconut oil, tallow fat and palm kernel oils.

In the same way as the addition of the above mentioned fatty acids, the addition of N-acylsarcosine derivatives to the soap bars of this invention is able to effect a further improvement in aspect and a reduction in discolouration. Preferred compounds for this purpose are those of the formula $$R-CO-\underset{\underset{CH_3}{|}}{N}-CH_2-COOH,$$

wherein R is alkyl or alkenyl of 8 to 17 carbon atoms. Examples of such compounds are N-laurylsarcosine and N-oleylsarcosine.

The soap bars of the present invention preferably contain the above sarcosine derivatives in an amount of 1 to 15% by weight, most preferably of 1 to 5% by weight, based on the total weight of the soap bar. The soap bars may contain these compounds either alone (naturally together with a silicate) or together with the above mentioned fatty acids.

The soap bars of the invention are prepared in the customary manner by incorporating into the soap base an antibacterial compound of the formula (1) (or a mixture of such compounds) with the silicate and optionally a fatty acid or a mixture of fatty acids each containing 8 to 22 carbon atoms (provided the soap base does not already contain free fatty acids) and/or additionally with the N-acylsarcosine derivatives mentioned above. In addition, further conventional constituents of soaps can be incorporated into the soap base, for example dulling agents, e.g. $TiO_2$, and chelating agents and water softeners, e.g. complexons such as NTA, EDTA, DTPA, perfumes etc.

As soap base it is possible to use e.g. soaps which are obtained by saponifying specific mixtures of different fats (triglycerides). Examples of such fats are: tallow fat, sperm oil, coconut oil, palm kernel oil, castor oil, lard, olive oil etc. The soaps can also be prepared from the corresponding acids by neutralisation, e.g. from a mixture of tallow fatty acid, coconut-palm kernel oil fatty acid and olein.

As is evident from the foregoing description, the present invention also relates to a method of improving the aspect of soaps which contain, as antimicrobial compound, one or more halogenated o-hydroxydiphenyl ethers of the formula (1), i.e. to a method of diminishing the discolouration of soaps on exposure to light, especially to sunlight, which discolouration is caused by the halogenated o-hydroxydiphenyl ether of the formula (1) which has been added to the soap as antimicrobial compound. This method comprises adding a colourless silicate which is virtually insoluble in water to the soap base and intimately mixing it therein. The silicates added in the method of this invention are specified in detail in the foregoing description of the soap bars prepared therewith.

It is preferred to add 0.1 to 10% by weight, especially 0.5 to 5% by weight, of silicate to the soap base, based on the total weight of the finished soap bar. The silicates employed are preferably alkaline earth metal silicates, preferably calcium or magnesium silicates. Magnesium silicates are most preferred.

For further improving the aspect of the soap and for further reducing discolouration, it is possible to add free, in particular straight-chain, preferably substantially saturated fatty acids of 8 to 22 carbon atoms or mixtures thereof, preferably in an amount from 0.1 to 15% by weight, especially 1 to 10% by weight, based on the total weight of the finished soap.

Examples of such fatty acids are: capric, lauric, myristic, palmitic, stearic, arachidic, sebacic, dodecanedicarboxylic, thapsisdicarboxylic and octadecandicarboxylic acid as well as mixtures of acids obtained from coconut oil, tallow fat or palm kernel oil. Preferred fatty acids are stearic acid, palmitic acid, myristic acid, lauric acid, and the acid mixtures obtained from coconut oil, tallow fat and palm kernel oils.

Instead of the cited fatty acids, or together with these, it is possible to improve further the aspect of the soap bars of the present invention by also incorporating in the soap base N-acylsarcosine derivatives, especially those of the formula $$R{-}CO{-}\underset{\displaystyle CH_3}{\underset{|}{N}}{-}CH_2{-}COOH,$$

wherein R is alkyl or alkenyl of 8 to 17 carbon atoms. These sarcosine derivatives can be incorporated in the soap base in an amount of 1 to 15% by weight, preferably 1 to 5% by weight, based on the total weight of the soap bar.

A variant of the method of the invention consists in not incorporating a virtually water-insoluble silicate in the soap base direct, but adding to the soap base a mixture of a water-soluble silicate, e.g. an alkali metal silicate such as water glass, and a metal salt which reacts with the water-soluble silicate to form a silicate which is virtually insoluble in water. It will be understood that the metal salt employed can only be one that forms with the water-soluble silicate a colourless silicate which is virtually insoluble in water. Suitable metal salts are colourless salts of bivalent or trivalent cations, especially alkaline earth metal salts, e.g. salts of calcium and, most particularly, magnesium. The nature of the anion is of minor importance. It can be e.g. a hydroxyl, halide, sulfate, nitrate or acetate ion or another anion of an inorganic or organic acid which forms with the metal a salt which is preferably readily soluble in water.

The following Examples illustrate the invention in more detail, but do not constitute any limitation thereof. Throughout, parts and percentages are by weight.

EXAMPLE 1

The additives listed in Table 1 are milled with a soap base obtained by saponifying a composition consisting of 75% of tallow fat, 20% of coconut fat and 5% of lard. The resultant soap samples A, B and C have the respective composition as indicated in Table I.

TABLE I

| additives | amount of the additives in % by weight, based on the total weight of each sample — sample A | B | C |
|---|---|---|---|
| 4,2',4'-trichloro-2-hydroxydiphenyl ether | — | 1.0 | 1.0 |
| sodium ethylenediaminetetraacetate (EDTA) | 0.05 | 0.05 | 0.05 |
| $TiO_2$ | 0.125 | 0.125 | 0.125 |
| $MgSiO_2$ | — | — | 1.0 |

To test the light stability and to determine the degree of discolouration, the 3 samples are then exposed to sunlight, up to 112, 505, 1471 and 1750 langleys. The degree of whiteness (brightness value) of the samples is afterwards measured with a ZEISS Elrepho-Photometer ® (standard light type D65, 2 degree standard viewer, filter FL 40), expressed in % and based on the absolute white in accordance with the CIR recommendation of 1.1.1969. The degrees of whiteness (brightness values) (DW) are reported in Table 2 (in %). This table also indicates the differences (diminution) of the degrees of whiteness (brightness values) compared with the respective unexposed sample (ΔY).

TABLE 2

| Sample exposure (langley) | | A | B | C |
|---|---|---|---|---|
| | | degree of whiteness (brightness) in % and diminution in degree of whiteness (brightness) | | |
| 0 | DW | 73.3 | 72.6 | 72.3 |
| 112 | DW | 70.8 | 65.9 | 68.1 |
| | ΔY | −2.5 | −6.7 | −4.2 |
| 505 | DW | 69.5 | 58.2 | 62.2 |
| | ΔY | −3.8 | −14.4 | −10.1 |
| 1471 | DW | 68.6 | 60.8 | 64.8 |
| | ΔY | −4.7 | −11.8 | −7.5 |
| 1750 | DW | 70.0 | 59.3 | 63.9 |
| | ΔY | −3.3 | −13.3 | −8.4 |

Table 2 indicates clearly that the diminution in the degree of whiteness (brightness) (ΔY) caused by the addition of 4,2',4'-trichloro-2-hydroxydiphenyl ether is markedly lowered, and the degree of whiteness markedly increased, by the addition of 1% of $MgSiO_3$. Similarly good results are obtained by replacing $MgSiO_3$ in sample C by a magnesium silicate with a ratio of MgO to $SiO_2$ of 1:1.5 and one with a ratio of MgO to $SiO_2$ of 1:3.3.

EXAMPLE 2

The additives listed in Table 3 are milled with a soap base obtained by saponifying a composition consisting of 75% of tallow fat, 20% of coconut fat and 5% of lard. The resultant samples B1 to B10 have the compositions given in Table 3.

TABLE 3

| additives | Amount of the additives in % by weight, based on the total weight of the respective sample — sample $B_1$ | $B_2$ | $B_3$ | $B_4$ | $B_5$ | $B_6$ | $B_7$ | $B_8$ | $B_9$ | $B_{10}$ |
|---|---|---|---|---|---|---|---|---|---|---|
| 4,2',4'-trichloro-2-hydroxydiphenyl ether | 0 | 0.5 | 0.5 | 0.5 | 0.5 | 0.5 | 0.5 | 0.5 | 0.5 | 0.5 |
| sodiumethylenediaminetetraacetate (EDTA) | 0.05 | 0.05 | 0.05 | 0.05 | 0.05 | 0.05 | 0.05 | 0.05 | 0.05 | 0.05 |
| $TiO_2$ | 0.125 | 0.125 | 0.125 | 0.125 | 0.125 | 0.125 | 0.125 | 0.125 | 0.125 | 0.125 |
| $MgSiO_3$ | — | — | 1.0 | 2.0 | 1.0 | 2.0 | 1.0 | 2.0 | 1.0 | 2.0 |

TABLE 3-continued

| additives | Amount of the additives in % by weight, based on the total weight of the respective sample | | | | | | | | | |
|---|---|---|---|---|---|---|---|---|---|---|
| | sample | | | | | | | | | |
| | $B_1$ | $B_2$ | $B_3$ | $B_4$ | $B_5$ | $B_6$ | $B_7$ | $B_8$ | $B_9$ | $B_{10}$ |
| stearic acid | — | — | — | — | 0.9 | 0.9 | — | — | 0.9 | 0.9 |
| N-lauroylsarcosine | — | — | — | — | — | — | 2.0 | 2.0 | 2.0 | 2.0 |

To test the light stability and to determine the degree of discolouration, the samples are then exposed to daylight up to 150, 500 and 1000 langleys. The degree of whiteness (brightness value) of the samples is afterwards measured with a ZEISS Elrepho-Photometer ® (standard light type D65, 2 degree standard viewer, filter FL 40), expressed in % and based on the absolute white in accordance with the CIR recommendation of 1.1.1969. The degree of whiteness values (brightness values) (DW) are reported in Table 4 (in %). This table also indicates the differences (diminution) of the degree of whiteness (brightness values) compared with the respective unexposed sample (ΔY).

TABLE 4

| Sample exposure (langley) | | $B_1$ | $B_2$ | $B_3$ | $B_4$ | $B_5$ | $B_6$ | $B_7$ | $B_8$ | $B_9$ | $B_{10}$ |
|---|---|---|---|---|---|---|---|---|---|---|---|
| | | degree of whiteness (brightness) in % and diminution in degree of whiteness (brightness) | | | | | | | | | |
| 0 | DW | 74.3 | 74.2 | 74.6 | 75.0 | 75.2 | 75.1 | 73.3 | 73.4 | 73.5 | 73.7 |
| 150 | DW | 67.4 | 62.5 | 68.6 | 69.2 | 69.5 | 70.0 | 68.3 | 68.4 | 68.8 | 69.8 |
| | ΔY | −6.9 | −9.7 | −6.0 | −5.8 | −5.7 | −5.1 | −5.0 | −5.0 | −4.9 | −3.9 |
| 500 | DW | 69.2 | 60.9 | 66.4 | 69.0 | 69.2 | 70.7 | 67.5 | 68.4 | 68.5 | 69.5 |
| | ΔY | −5.1 | −14.3 | −8.2 | −6.0 | −6.0 | −4.4 | −5.8 | −5.0 | −5.0 | −4.2 |
| 1000 | DW | 68.2 | 60.7 | 65.2 | 68.9 | 70.9 | 71.3 | 67.9 | 68.0 | 67.0 | 68.8 |
| | ΔY | −6.1 | −14.5 | −9.4 | −6.1 | −4.3 | −3.8 | −5.4 | −5.4 | −6.5 | −4.9 |

Table 4 indicates clearly that the diminution in the degree of whiteness (brightness) (ΔY) caused by the addition of 4,2',4'-trichloro-2-hydroxydiphenyl ether is markedly lowered, and the degree of whiteness markedly increased, by the addition of 1% and 2% respectively, of $MgSiO_2$ (samples B3 and B4). A further increase in the degree of whiteness (diminution of the loss of brightness) is obtained by the additional use of stearic acid (samples B5 and B6) and/or lauroylsarcosine (samples B7 to B10).

Similarly good ΔY values as indicated in Table 4 for the corresponding soap samples are obtained by replacing $MgSiO_3$ in each of samples B3 to B10 by corresponding amounts of a magnesium silicate with a ratio of MgO to $SiO_2$ of 1:1.5 and one with a ratio of 1:3.3.

What is claimed is:

1. A soap bar with antimicrobial action containing, as antimicrobial compound, a halogenated o-hydroxydiphenyl ether of the formula

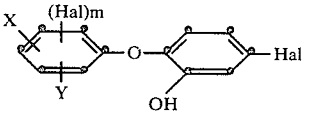

(I)

wherein X is halogen, methyl, methoxy or hydroxy, Y is hydrogen, methyl or trifluoromethyl, Hal is a halogen atom and m is 0, 1 or 2, which soap bar additionally contains a water-insoluble, colorless magnesium silicate in an amount sufficient to effectively diminish discoloration of the bar on exposure to light.

2. A soap bar according to claim 1, wherein the antimicrobial compound is a halogenated o-hydroxydiphenyl ether of the formula

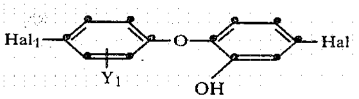

(2)

wherein each of Hal and $Hal_1$ independently is a halogen atom and $Y_1$ is hydrogen or halogen.

3. A soap bar according to claim 1 which contains the antimicrobial compound in a concentration of 0.05 to 3% by weight, based on the total weight of the soap bar.

4. A soap bar according to claim 1 which contains the magnesium silicate in a concentration of 0.1 to 10% by weight, based on the total weight of the soap bar.

5. A soap bar according to claim 1 which additionally contains one or more free, substantially saturated, fatty acids each containing 8 to 22 carbon atoms.

6. A soap bar according to claim 1 which additionally contains a N-acylsarcosine of the formula $$R{-}CO{-}\underset{\displaystyle CH_3}{\underset{|}{N}}{-}CH_2{-}COOH$$

wherein R is alkyl or alkenyl of 8 to 17 carbon atoms.

7. A soap bar of claim 1 which further contains a perfume, a dulling agent, a colorant, a chelating agent or a water softener.

8. A soap bar of claim 2, wherein the antimicrobial compound is 4,2',4'-trichloro-2-hydroxydiphenyl ether.

9. A soap bar of claim 3, wherein the concentration of the antimicrobial compound is 0.2 to 2% by weight.

10. A soap bar of claim 4, wherein the concentration of magnesium silicate is 0.5 to 5% by weight.

11. A soap bar according to claim 5, wherein the fatty acid is stearic acid, lauric acid, palmitic acid, myristic acid or a mixture of acids which can be obtained from coconut oil, tallow fat or palm kernel oils.

12. A soap bar according to claim 5 which contains 0.1 to 15% by weight of free fatty acid, based on the total weight of the soap bar.

13. A soap bar according to claim 6 which contains 1 to 15% by weight of a N-acylsarcosine, based on the total weight of the soap bar.

14. A soap bar of claim 11, wherein the fatty acid is stearic acid.

15. A soap bar of claim 12, containing 1 to 10% by weight of the free fatty acid.

16. A soap bar of claim 13, containing 1 to 5% by weight of the N-acylsarcosine.

* * * * *